July 31, 1951   F. KOSS, JR   2,562,316
VEHICLE SPRING SUPPORTER
Filed Oct. 19, 1948
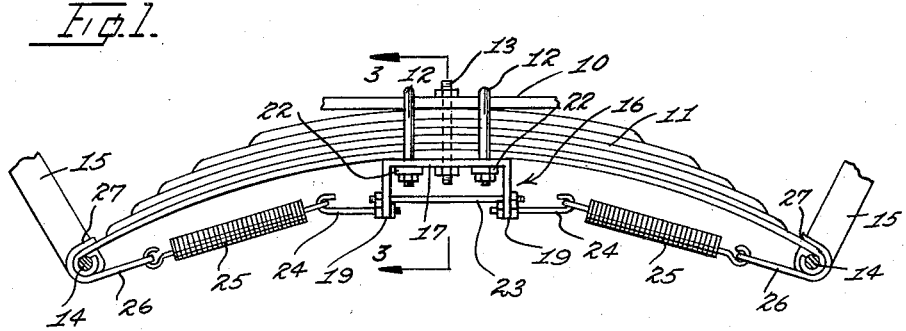
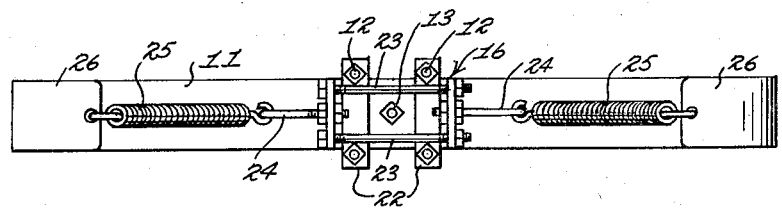
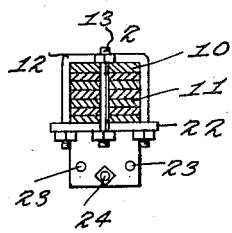
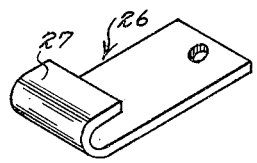
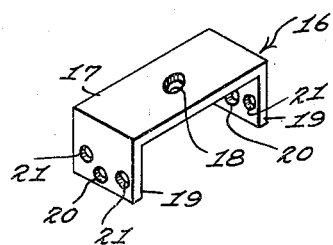
INVENTOR.
Frank Koss, Jr
BY
McMorrow, Berman + Davidson
ATTORNEYS Patented July 31, 1951

2,562,316

UNITED STATES PATENT OFFICE 2,562,316

VEHICLE SPRING SUPPORTER

Frank Koss, Jr., Tecumseh, Ontario, Canada

Application October 19, 1948, Serial No. 55,281

3 Claims. (Cl. 267—28)

My invention relates to vehicle spring supporters, and more particularly to supporters for the semi-elliptical springs of motor vehicles. The device according to the invention is particularly well adapted for such semi-elliptical springs as extend transversely of the chassis of the vehicle. I have found that such springs, after a comparatively short period of use become weakened and tend to flatten out, whereby the value of the spring is materially lessened.

With the foregoing in view, it is an object of my invention to provide an improved supporter for vehicle springs of the class described.

A further object is to provide an improved supporter for semi-elliptical vehicle springs which includes a bracket adapted to be secured to the concave side of the vehicle springs centrally thereof, and individual contractile springs operatively connecting opposite sides of the bracket to opposite ends of the vehicle spring whereby to restrain the same against straightening out, and/or to flex the same into a semi-elliptical shape.

Other objects and advantages reside in the particular structure of the invention, combination and arrangement of the several parts thereof, and will be readily understood by those skilled in the art upon reference to the drawing in connection with the following specification, wherein the invention is shown, described and claimed.

In the drawing:

Figure 1 is a front elevational view of the device according to the invention, showing the same applied to a vehicle spring;

Figure 2 is a bottom plan view thereof;

Figure 3 is a transverse vertical sectional view taken substantially on the line 3—3 of Figure 1;

Figure 4 is a perspective view of the bracket for supporting the supporter;

Figure 5 is a perspective view of one of the hooks adapted to be attached to the vehicle spring.

Referring specifically to the drawing, wherein like reference characters have been used throughout the several views to designate like parts, 10 designates a suitable portion of the vehicle frame to which is attached a semi-elliptical spring 11 by any suitable and/or usual means, such as the U-bolts 12 disposed about the center bolt 13. The opposite ends of the spring 11 are supported on the usual pins 14 of the shackles 15. As so far described, the structure is conventional and forms no part of my invention.

The device according to the invention comprises a U-shaped bracket generally indicated at 16 and best seen in Figure 4. The bracket 16 comprises a web 17 which is formed with a central aperture 18 for the reception of the center bolt 13. The web 17 extends longitudinally of the vehicle spring 11 along the concave side thereof. The bracket 16 includes a pair of downwardly or vertically-directed flanges 19 which extend transversely of the vehicle spring 11. As clearly shown in Figures 1 and 3, the U-bolts 12 span the bracket web 17 and assist the center bolt 13 in securing the bracket in place. This is accomplished by the usual washers 22 which connect the legs of the U-bolts 12. Each flange 19 is provided with a centrally-disposed opening or hole 20 therein and a pair of laterally-spaced and inwardly-offset holes 21. The holes 21 are adapted to receive the opposite ends of bolts 23 which are secured in place by the usual nuts whereby to prevent the flanges 19 from spreading under a load. The centrally-disposed openings or holes 20 are adapted to receive the straight ends of hook bolts or eye-bolts 24 which include the usual nuts bearing against the inner surfaces of the flanges 19, whereby the length of the shanks of the eye-bolts may be varied. Each eye-bolt is connected to the inner end of a contractile coil spring 25. The outer ends of the springs 25 are secured to the free inner ends of the shanks of a pair of hooks 26. The shanks of the hooks 26 are inwardly directed toward each other along the concave side of the vehicle spring 11 and the bills 27 of the hooks are hooked about the ends of the vehicle spring 11.

As is readily apparent from the foregoing, by adjusting the length of the eye-bolts 24, the springs 25 may be adjusted for tension, whereby to control the flexing of the vehicle spring 11. In case the vehicle spring 11 has become flattened, the arrangement just described can serve to flex the vehicle spring back into its original semi-elliptical form. In the case of a new vehicle spring, the attachment retards flexing of the vehicle spring whereby to lengthen its life and increase its strength.

While I have shown and described what is now thought to be a preferred embodiment of the invention, the same is susceptible of other forms and expressions. Consequently, I do not limit myself to the precise structure shown and described hereinabove except as hereinafter claimed.

I claim:

1. In combination with a semi-elliptical leaf spring, a supporter comprising a U-shaped bracket underlying the bowed side of the spring, said bracket including a web extending longitudinally of the spring, means securing said web on the spring intermediate the length thereof, a transverse flange on each end of said web, and contractile resilient means engaged between the ends of said leaf spring and said flanges, said means including adjusting members engaging said flanges for connecting the resilient means thereto and for selectively adjusting the tension of said resilient means for flexing the spring on the bowed side thereof and hook members engaging the ends of said spring and connecting said resilient means thereto.

2. In combination with a semi-elliptical leaf spring, a supporter comprising a bracket for underlying the bowed side of the leaf spring intermediate the length thereof, confronting hook members engaging the opposite ends of the leaf spring, means fixedly securing said bracket to the spring, oppositely extending hook elements on said bracket, means adjustably securing said hook elements on said bracket for selected adjustment along the length of the leaf spring, and contractile springs engaged between each of said hook elements and said confronting hooks for flexing the leaf spring on the bowed side thereof.

3. A supporter for a semi-elliptical leaf spring comprising a U-shaped bracket having its web portion adapted to extend longitudinally of and underlie the bowed side of a leaf spring, means for affixing said web portion to said spring, a pair of legs depending from the ends of said web portion, outwardly projecting hook elements transversely carried by the legs, means adjustably mounting said hook elements to the legs for axial adjustment thereof, contractile springs affixed at one of their ends to the hook elements, and hooks adapted to engage the ends of said leaf spring and supporting the other ends of the contractile springs, whereby said leaf spring may be flexed on the bowed side thereof.

FRANK KOSS, Jr.

REFERENCES CITED

The following references are of record in the file of this patent:

UNITED STATES PATENTS

| Number | Name | Date |
| --- | --- | --- |
| 246,479 | Doble | Aug. 30, 1881 |
| 905,981 | Blair | Dec. 8, 1908 |
| 1,453,061 | Brundige | Apr. 24, 1923 |
| 1,694,281 | Litten | Nov. 27, 1928 |
| 1,763,192 | Shears | June 10, 1930 |
| 1,791,661 | Cunningham | Feb. 10, 1931 |
| 2,446,395 | Wallace | Aug. 3, 1948 |
| 2,457,243 | Kucera | Dec. 28, 1948 |

FOREIGN PATENTS

| Number | Country | Date |
| --- | --- | --- |
| 452,317 | Germany | May 2, 1926 |